US012669164B2

(12) United States Patent \
Lasne et al.

(10) Patent No.: US 12,669,164 B2 \
(45) Date of Patent: Jun. 30, 2026

(54) METHOD FOR JOINING THE ENDS OF A LINEAR BELT IN ORDER TO FORM AN ENDLESS BELT FOR THE TRANSPORT OF FOODSTUFFS

(71) Applicant: LIFTVRAC, Geneston (FR)

(72) Inventors: Régis Lasne, Geneston (FR); François Riot, Geneston (FR)

(73) Assignee: LIFTVRAC, Geneston (FR)

( * ) Notice: Subject to any disclaimer, the term of this patent is extended or adjusted under 35 U.S.C. 154(b) by 302 days.

(21) Appl. No.: 18/285,566

(22) PCT Filed: Apr. 13, 2022

(86) PCT No.: PCT/EP2022/059949 \
§ 371 (c)(1), \
(2) Date: Oct. 4, 2023

(87) PCT Pub. No.: WO2022/223416 \
PCT Pub. Date: Oct. 27, 2022

(65) Prior Publication Data \
US 2024/0183426 A1     Jun. 6, 2024

(30) Foreign Application Priority Data

Apr. 20, 2021     (FR) ..................................... 2104071

(51) Int. Cl. \
*F16G 3/10*          (2006.01) \
*B65G 15/34*         (2006.01) \
*B65G 15/42*         (2006.01)

(52) U.S. Cl. \
CPC ............... *F16G 3/10* (2013.01); *B65G 15/34* (2013.01); *B65G 15/42* (2013.01); *B65G 2201/0202* (2013.01)

(58) Field of Classification Search \
CPC ........... F16G 3/10; B65G 15/34; B65G 15/42; B65G 2201/0202 \
See application file for complete search history.

(56) References Cited

U.S. PATENT DOCUMENTS

2022/0135335 A1*   5/2022  Boursier ................ B65G 15/36 \
198/804

FOREIGN PATENT DOCUMENTS

| FR | 1154067 A | 4/1958 |
| FR | 1165278 A | 10/1958 |
| FR | 3092573 A1 | 8/2020 |
| JP | S6065936 A | 4/1985 |
| JP | S60210433 A | 10/1985 |

* cited by examiner

*Primary Examiner* — S. Behrooz Ghorishi \
(74) *Attorney, Agent, or Firm* — Alleman Hall LLP

(57)          ABSTRACT

A method of joining the longitudinal ends of a linear belt to form an endless belt configured to be mounted in a conveyor for upward transport of foodstuffs, the joining method comprising steps of: solidarization of the longitudinal ends of the linear belt, formation of at least one recess in the first longitudinal end and in the second longitudinal end of the linear belt so as to uncover at least one reinforcing members and solidarization of a connecting member in the recess, the connecting element comprising additional reinforcing members and shape complementary to said recess, the recess being formed from the product face of the linear belt.

12 Claims, 7 Drawing Sheets

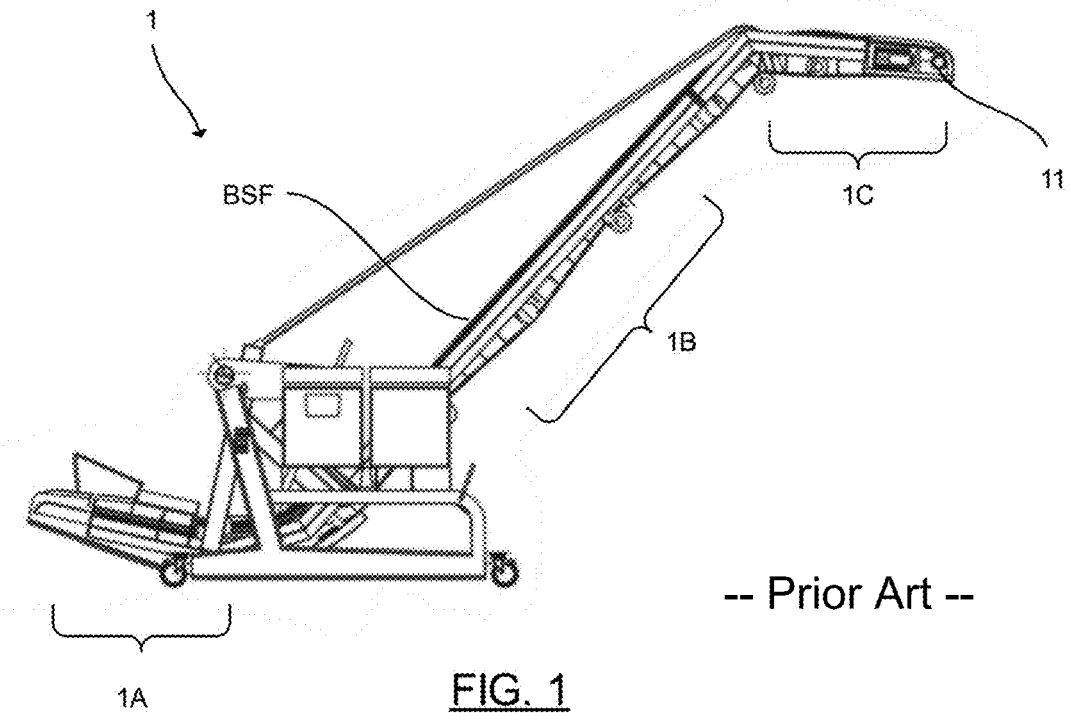
-- Prior Art --
FIG. 1
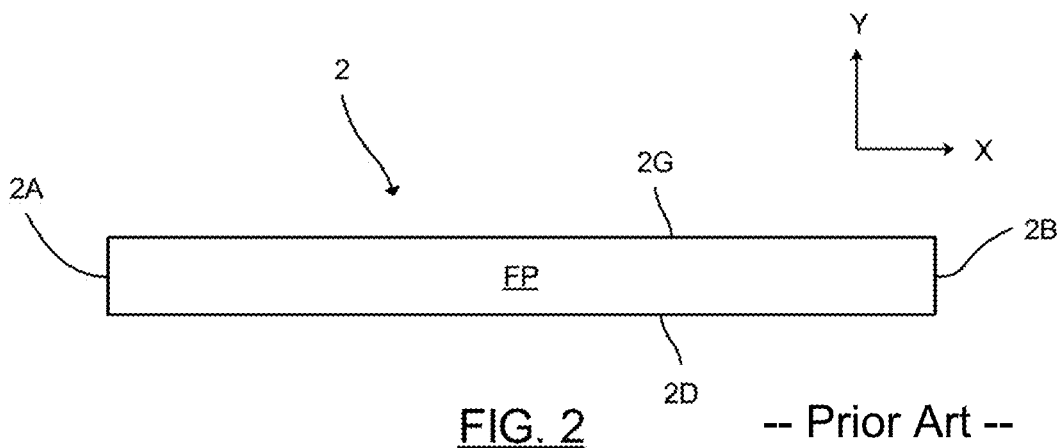
FIG. 2          -- Prior Art --

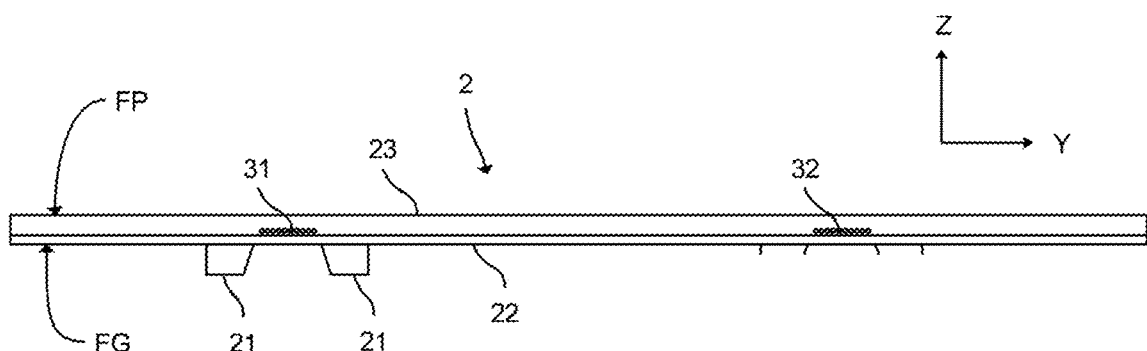
FIG. 3        -- Prior Art --
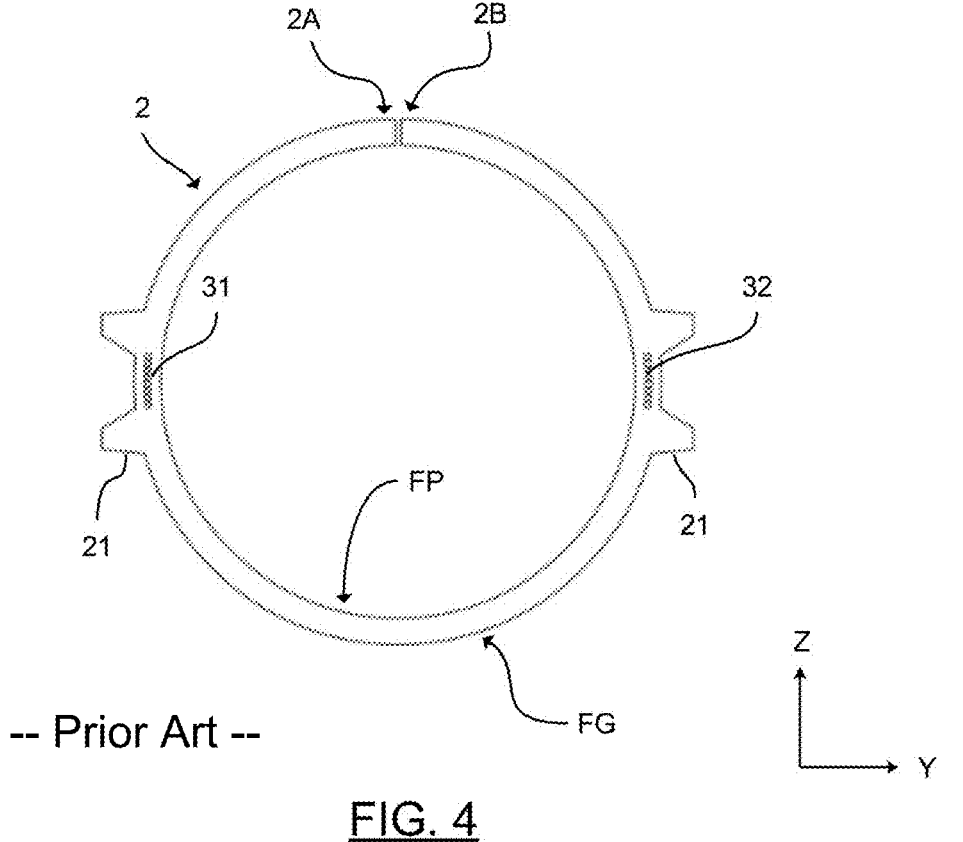
-- Prior Art --
FIG. 4

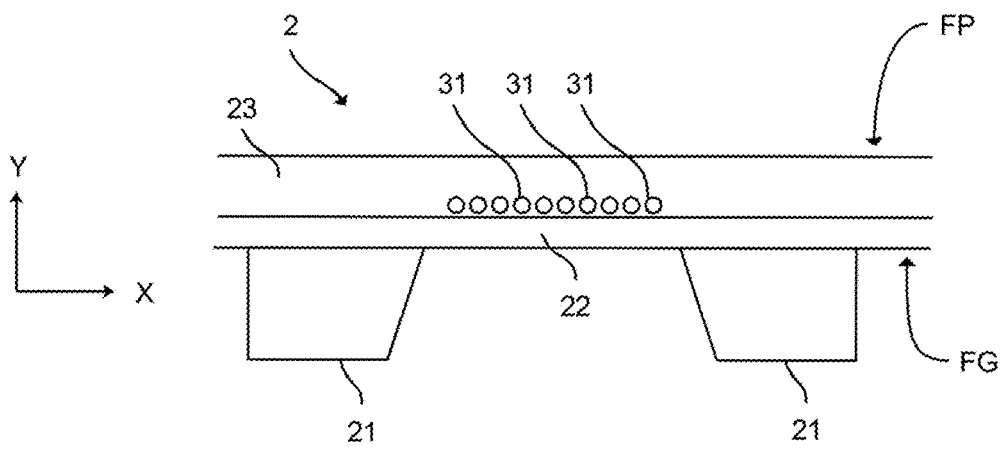
-- Prior Art --
<u>FIG. 5</u>
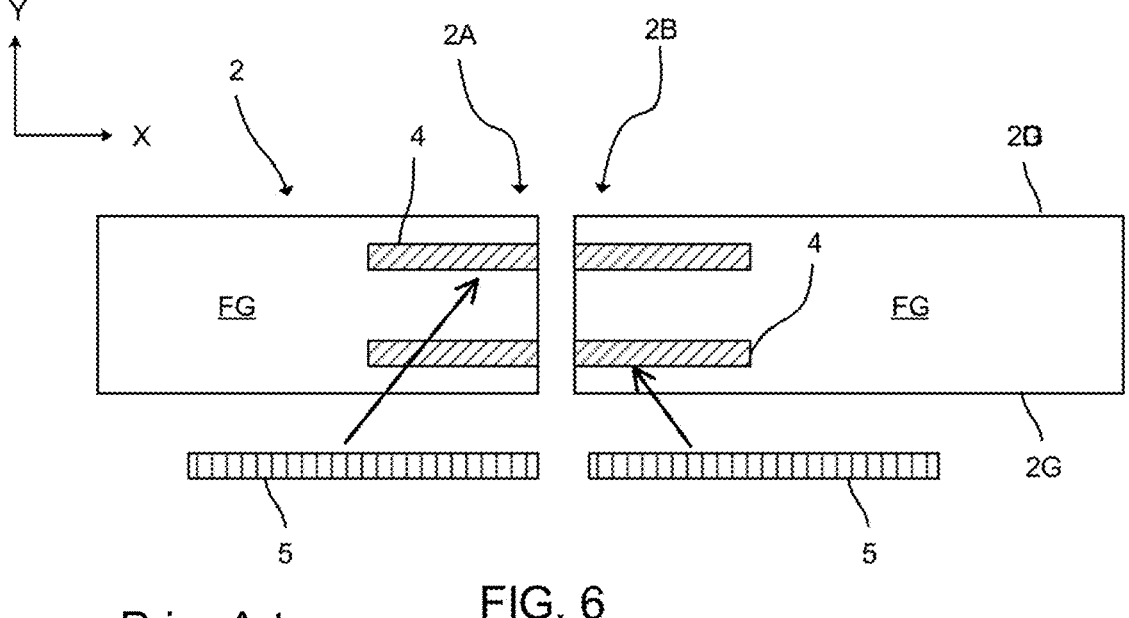
-- Prior Art --
<u>FIG. 6</u>

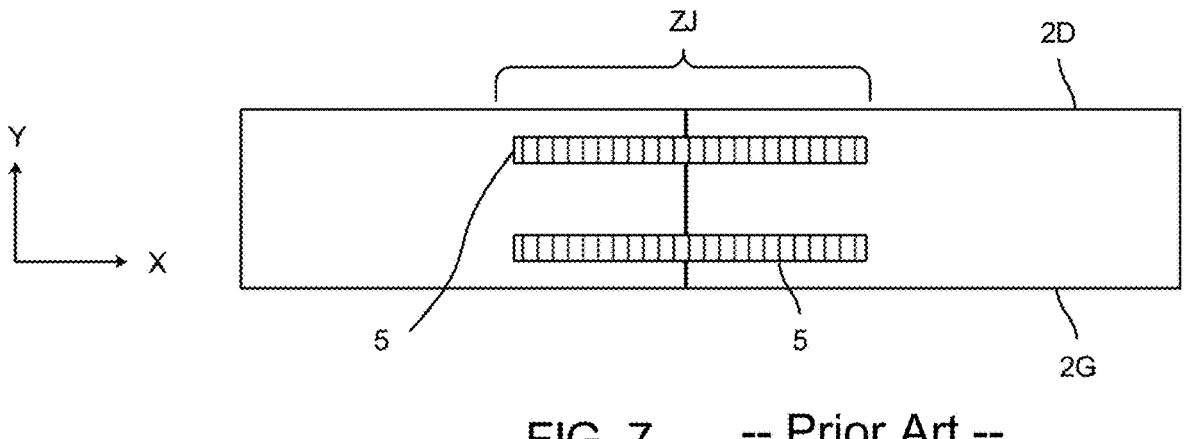
FIG. 7       -- Prior Art --
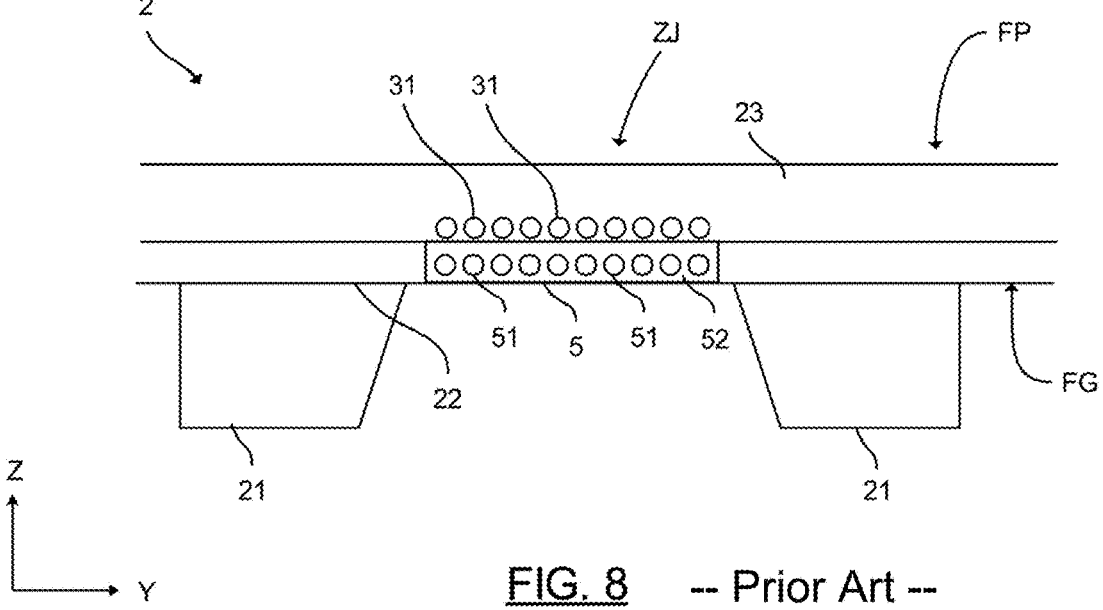
FIG. 8       -- Prior Art --

METHOD FOR JOINING THE ENDS OF A LINEAR BELT IN ORDER TO FORM AN ENDLESS BELT FOR THE TRANSPORT OF FOODSTUFFS

The present invention relates to the field of foodstuff transport and more particularly to a method for joining the ends of a linear belt in order to form an endless belt for the transport of foodstuffs.

In a known manner, in reference to FIG. 1, patent application FR3092573 is a conveyor 1 used to transport foodstuffs from a lower level to a higher level by means of an endless conveyor belt BSF. The conveyor 1 typically comprises a low infeed 1A, an ascending portion 1B and a high outfeed 1C. Such a conveyor 1 is particularly advantageous in the food industry and may be integrated into a manufacturing, processing or packaging line, for example for bulk products such as minced meat, fish or fish pieces, vegetables, grated cheese, etc.

In a known manner, in reference to FIGS. 2 and 3, the endless belt BSF is obtained from a linear belt 2 that extends longitudinally along an X axis, laterally along a Y axis and vertically along a Z axis. The linear belt 2 comprises two lateral edges 2G, 2D and two ends 2A, 2B that are rigidly connected to form a loop (endless belt BSF).

As shown in FIG. 3, the linear belt 2 comprises, in a known manner, a top face, called "product face" FP, intended to be in contact with foodstuffs, and a bottom face, called "drive face" FG, intended to be in contact with the drive members 11 of the conveyor 1 (FIG. 1). To this end, the drive face FG comprises teeth 21 to cooperate with the drive members 11 of the conveyor 1.

In a known manner, the linear belt 2 is transversely deformable between a flat position (FIG. 3) and a tubular position (FIG. 4). The linear belt 2 is generally in a practically flat position when foodstuff is received at the low infeed 1A of conveyor 1 and when it is distributed at the high outfeed 1C of conveyor 1. On the ascending portion 1B of the conveyor 1, the linear belt 2 is in the tubular position to limit foodstuff loss and allow them to ascend.

In reference to FIGS. 2 and 3, in order to enable optimum tubular deformation, the linear belt 2 comprises at least two superimposed layers 22, 23 having different hardnesses. The product face FP is known to belong to an upper layer 23 formed in a material with low hardness, giving it good adhesion, which is favorable for the transport of products and its cleaning. The material is preferably flexible to more easily form the linear belt 2 in its tubular configuration, without introducing excessive constraints into the linear belt 2. The drive face FG is known to belong to a lower layer 22 formed in a material with a higher hardness and thus a lower coefficient of friction, so as to increase its service life by limiting friction when cooperating with the guide rails of the conveyor 1.

In addition, as shown in FIGS. 3 and 4, to optimally take up the longitudinal loads during its driving, the linear belt 2 integrates in its thickness a plurality of longitudinal reinforcing members 31, 32 (cables, flat straps, etc.). In practice, in reference to FIG. 5, the reinforcing members 31 are integrated into the upper layer 23, i.e., on the side of the product face FP. Such a linear belt 2 has high performance. When the linear belt 2 comprises three layers, the reinforcing members 31 may be integrated into the intermediate layer.

As presented previously, to manufacture an endless belt BSF, a linear belt 2 is available which is, preferably, packaged in rolls. A length of linear belt 2 is cut and the ends 2A, 2B of the linear belt 2 are joined at a joining zone to form the endless belt BSF, i.e. annular.

Such a joining is critical as it is likely to form a weak point reducing the service life of the endless belt BSF. One of the main difficulties is to ensure continuity of the reinforcing members 31, 32 at the joining zone.

In the prior art, to make a joining, the two ends 2A, 2B of the linear belt 2 are joined and connecting elements 5 are added to join the two ends 2A, 2B as shown in FIG. 6. The connecting elements 5 must be integrated into the thickness of the linear belt 2 to avoid creating a relief on one of the faces FG, FP of the linear belt 2, in particular, on the product face FP which must remain perfectly smooth to allow optimum cleaning.

Also, as shown in FIGS. 6 and 7, it was proposed to form recesses 4 in the drive face FG, of high hardness, to reach the existing reinforcing members 31, 32 and to add the connecting elements 5 to them in order to provide the interface. As shown in FIG. 8, the connecting elements 5 comprise additional reinforcing members 51 which are embedded in a material of high hardness 52 in order to ensure continuity with the lower layer 22 of high hardness.

Such a method makes it possible to protect the product face FP, which remains smooth. In addition, such a method is simple to implement since the drive face FG is formed in the high hardness lower layer 22 which is, by nature, simple to machine, which facilitates the formation of recesses 4.

In addition, the reinforcing members 31, 32 are located close to the drive face FG and the recesses 4 advantageously have a reduced depth, which reduces the formation time of the recesses 4. In reference to FIGS. 7 and 8, when the joining is made, the linear belt 2 comprises, at its joining zone ZJ, a superpositioning of reinforcing members 31 and additional reinforcing members 51.

However, such a method for joining has several disadvantages. Access to the reinforcing members 31, 32 is difficult as they are generally formed near teeth 21 of the drive face FG as shown in FIG. 5, which complicates the work of the operator. In addition, the width of the recesses 4 is constrained by the spacing between the teeth 21. Sometimes it is not possible to uncover all the reinforcing elements 31 in an optimal way. An immediate solution to eliminate this disadvantage would be to move the teeth 21, but this would involve modifying the conveyor 1 on which the endless belt BSF is mounted, which may not be considered. Another immediate solution would be to move the reinforcing members 31, 32 away from the teeth 21, but these are positioned optimally to take up the longitudinal loads of the endless belt BSF, particularly in the tubular position.

In addition to the disadvantages linked with the teeth 21, when the endless belt BSF is in the tubular position, the connecting elements 5 undergo high pull-out loads and are likely to bend, which may lead to their detachment and breakage of the joining.

Patent applications FR1154067A and FR1165278A are also known for methods of assembling the edges of a linear belt, wherein the ends are joined respectively by applying adhesive tape and vulcanizing.

One of the objects of the invention is to propose a new method for joining the ends of a linear belt in order to form a joining that is robust and simple to make.

SUMMARY

The invention relates to a method for joining the longitudinal ends of a linear belt in order to form an endless belt configured to be mounted in an ascending food transport conveyor, the linear belt comprising two lateral edges, two longitudinal ends, a top face for receiving foodstuffs to be transported, hereinafter referred to as the product face, and an opposite bottom face, intended to cooperate with means of driving the conveyor, hereinafter referred to as the drive face, the linear belt being transversely deformable between a flat, idle configuration and a tubular or at least substantially tubular configuration, wherein the two lateral edges are positioned edge to edge, the linear belt comprising an upper layer made of a material having a first hardness and forming said product face, and a lower layer made of a material having a second hardness, greater than the first hardness, and forming said drive face, the linear belt comprising a plurality of longitudinal reinforcing members, arranged in its thickness, adapted to limit its longitudinal elongation during its use, method for joining comprising steps of:

Rigidly connecting the longitudinal ends of the linear belt,

Forming of at least one recess in the first longitudinal end and in the second longitudinal end of the linear belt in order to uncover at least one reinforcing member, Rigidly connecting a connecting element in the recess, the connecting element comprising additional reinforcing elements and having a shape complementary to said recess, The method is remarkable in that the recess is formed from the product face of the linear belt.

Such a method for joining goes against an established bias that required the formation of recesses from the drive face that was simpler and shallower to machine. Thanks to the formation of recesses from the product face, the strength of the connecting elements over time is improved and the stresses related to the drive face, especially those related to the teeth, are no longer present. The service life of the endless belt is improved.

Preferably, the longitudinal ends are beveled, preferably, with a beveling angle of between 30° and 60°. Such a bevel angle distributes the loads linked to the joining over a more substantial longitudinal joining zone, which improves the service life of the endless belt.

Preferably, the connecting element is rigidly connected to said recess by heating. Heating the connecting element allows the latter to amalgamate with the material of the upper layer, ensuring a robust and optimal connection.

According to a preferred aspect, the method comprises a step of pressing the connecting element into said recess subsequent to the heating step. The amalgamation is thus controlled while forming a completely smooth surface for the product face.

Preferably, the longitudinal reinforcing members are positioned in the upper layer. Thus, the additional longitudinal reinforcing elements make it possible to ensure optimum load take-up.

Preferably, the connecting element comprises additional reinforcing elements embedded in a material similar to that of the upper layer. Thus, the amalgamation between homogeneous materials enables a robust connection.

Preferably, the linear belt comprises at least two groups of longitudinal reinforcing members, preferably, only two. Preferably, the method comprises a step of forming two recesses to uncover the two groups of longitudinal reinforcing members.

Preferably, the connecting element has a length of between 20 cm and 100 cm. Preferably, the connecting element has a thickness of between 20 mm and 70 mm. Such a connecting element is not constrained by the teeth of the drive face and make it possible to take advantage of the depth of the reinforcing devices from the product face.

According to one aspect, the lower layer comprises teeth adapted to cooperate with drive members of said conveyor device, the longitudinal reinforcing members are positioned at least partially above the teeth. Preferably, the longitudinal reinforcing members are closer to the drive face than to the product face.

BRIEF DESCRIPTION OF THE DRAWINGS

The invention will be better understood upon reading the following description, given as an example, and in reference to the following figures, given as non-limiting examples, wherein identical references are given to similar objects.

FIG. 1 is a schematic representation of a conveyor equipped with an endless belt.

FIG. 2 is a schematic representation viewed from above of a linear belt according to the prior art.

FIG. 3 is a schematic cross-sectional representation of a linear belt according to the prior art flat.

FIG. 4 is a cross-sectional view of the belt in FIG. 3 in tubular position.

FIG. 5 is a close-up schematic representation of the reinforcing members in FIG. 3.

FIG. 6 is a schematic representation of a step of forming recesses in the linear belt according to the prior art.

FIG. 7 is a schematic representation of a step of positioning connecting elements according to the prior art.

FIG. 8 is a schematic cross-sectional representation of a joining zone of an endless belt according to the prior art.

Figure 9:
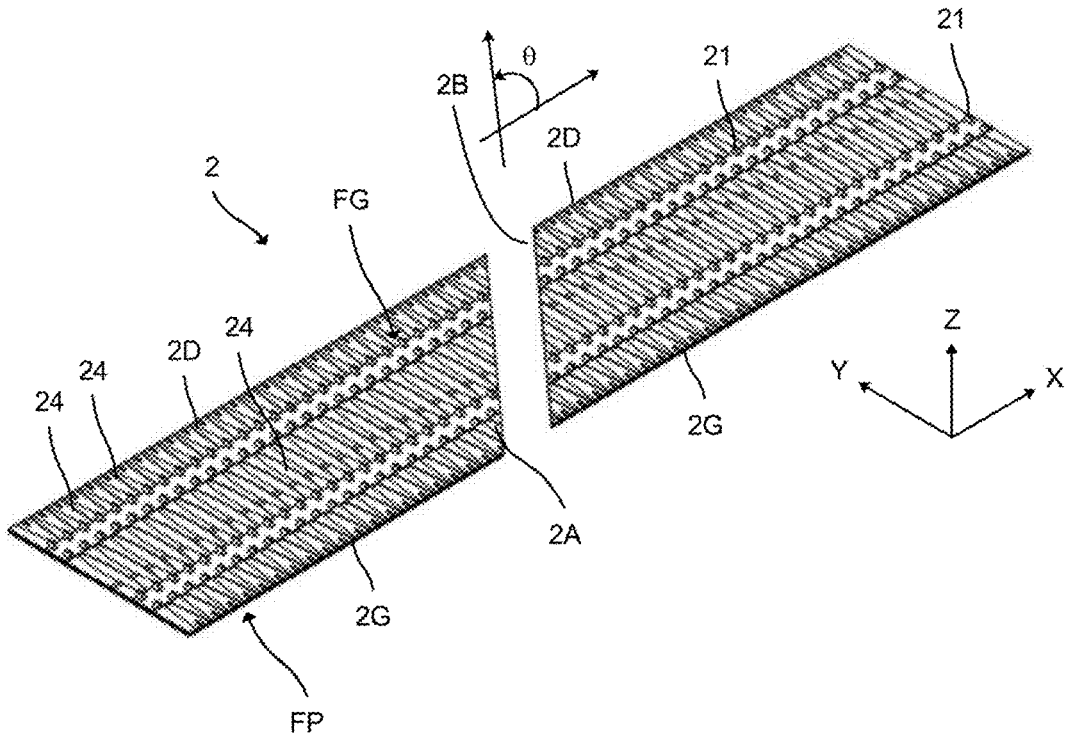
FIG. 9 is a schematic representation of a linear belt according to the invention before its joining.

It should be noted that the figures set out the invention in detail in order to implement the invention, said figures may of course be used to better define the invention where applicable.

DETAILED DESCRIPTION

A method for manufacturing an endless belt BSF according to the invention from a linear belt 2 will now be presented.

Such an endless belt BSF is intended to be used in a conveyor 1 such as shown previously in the preamble. As shown in FIG. 1, the conveyor 1 conventionally comprises a low infeed 1A, an ascending portion 1B, and a high outfeed 1C. The conveyor 1 comprises drive members 11, in particular toothed wheels, to drive the endless belt BSF.

As presented previously, to manufacture an endless belt BSF, a linear belt 2 is available which is, preferably, packaged in rolls. The linear belt 2 is analogous to the prior art (with the exception of its longitudinal ends as will be presented later). For the sake of clarity and conciseness, reference will be made to the description of the preamble and the drawings of the preamble again in the detailed description.

As explained previously, in a known manner, in reference to FIG. 9, the linear belt 2 extends longitudinally along an X axis, laterally along a Y axis and vertically along a Z axis. The linear belt comprises two lateral edges 2G, 2D and two longitudinal ends 2A, 2B. Preferably, the belt has a width of between 300 mm and 400 mm, preferably, about 350 mm in order to be adapted to the food sector.

The belt 2 comprises in a known manner a top face, designated "product face" FP, intended to be in contact with foodstuffs, and a bottom face, called "drive face" FG, intended to be in contact with drive members 11 of the conveyor 1. To this end, the drive face FG comprises teeth 21 to cooperate with the drive members 11 of the conveyor 1. In a known manner, as explained previously, the linear belt 2 is deformable transversely between a flat position and a tubular position.

As previously, in reference to FIGS. 2 and 3, in order to allow optimum tubular deformation, the linear belt 2 comprises at least two superimposed layers 22, 23 with different hardnesses. The product face FP is known to belong to a top layer 23 formed in a material with low hardness, giving it better adhesion, which is favorable for transporting products. The material is preferably flexible to more easily form the linear belt 2 in its tubular configuration, without introducing excessive constraints into the linear belt 2. The drive face FG belongs in a known manner to a lower layer 22 formed in a material with a higher hardness, so as to increase its service life by limiting friction during its cooperation with the drive members 11 of the conveyor 1. The layers 22, 23, of different hardnesses, may be made of the same or different materials, what is important is to maintain an optimal connection between the materials. By way of example, the layers 22, 23 may be made of polyurethane-type elastomer, so as to allow its deformation in a transverse direction with respect to its length, in particular to enable it to be placed in a tubular configuration.

By way of example, the lower layer 22, of high hardness, has a hardness of between 52 shore D and 55 shore D, preferably about 54 shore D. By way of example, the upper layer 23, of low hardness, has a hardness of between 70 shore A and 85 shore A, preferably about 70 shore A. Hardness scales are known to those skilled in the art and are in particular described in the ISO868, ASTMD 2240, DIN 535050 standards. In this example, only two layers are presented, but it goes without saying that linear belt 2 could comprise more than two, notably three.

According to a preferred aspect of the invention, the upper layer 23 defines a product face FP that is flat, i.e., without relief, which allows its practical cleaning by scraping. According to another aspect of the invention not shown, the linear belt 2 comprises thickened longitudinal edges as taught by patent application FR3092573A1, preferably formed on the upper layer 23 of lower hardness.

As shown in FIG. 9, the lower layer 22 advantageously comprises softening recesses 24 which allow the longitudinal deformation resistance of the conveyor belt 2 to be reduced. Such softening recesses 24 are known by patent application FR2933964A1. Other embodiment variants may not have such softening recesses 24.

In this example of implementation, the lower layer 22 comprises teeth 21 protruding on the side of the drive face FG adapted to cooperate with drive members 11 of conveyor 1. In reference to FIG. 9, the teeth 21 are arranged in evenly spaced lateral lines. The teeth 21 are four on each transverse line, positioned in pairs of two symmetrically on either side of a median axis of the linear belt 2. Preferably in such a configuration, each pair of teeth 21 is positioned at the neutral fiber. It goes without saying that the number of teeth 21 on a lateral line could be different, in particular, equal to 2.

As presented previously, to allow optimum take-up of longitudinal loads during its driving, the linear belt 2 integrates in its thickness a plurality of longitudinal reinforcing members 31, 32 (cables, flat straps, etc.). In practice, the reinforcing members 31, 32 are integrated into the upper layer 23 of low hardness, i.e., on the side of the product face FP. In this example, the longitudinal reinforcing members 31, 32 are closer to the drive face FG than to the product face FP. The longitudinal reinforcing members 31, 32 are preferably in the form of aramid fibers.

In this example, as shown in FIG. 3, the linear belt 2 comprises two groups of longitudinal reinforcing members 31, 32 that are laterally separated. The number of reinforcing members 31, 32 per group may vary but is preferably between 5 and 20. Preferably, the reinforcing members 31, 32 follow the neutral fiber of the endless belt BSF in tubular configuration and make it possible to improve its mechanical strength. In the case of a linear belt 2 comprising four teeth 21 on each transverse line, i.e. comprising two pairs of teeth 21, each group of reinforcing members 31, 32 is preferably positioned in the vicinity of a pair of teeth 21, in particular, between the teeth 21 as shown in FIG. 5. The linear belt 2 is known to those skilled in the art and will not be presented in more detail.

Figure 12:
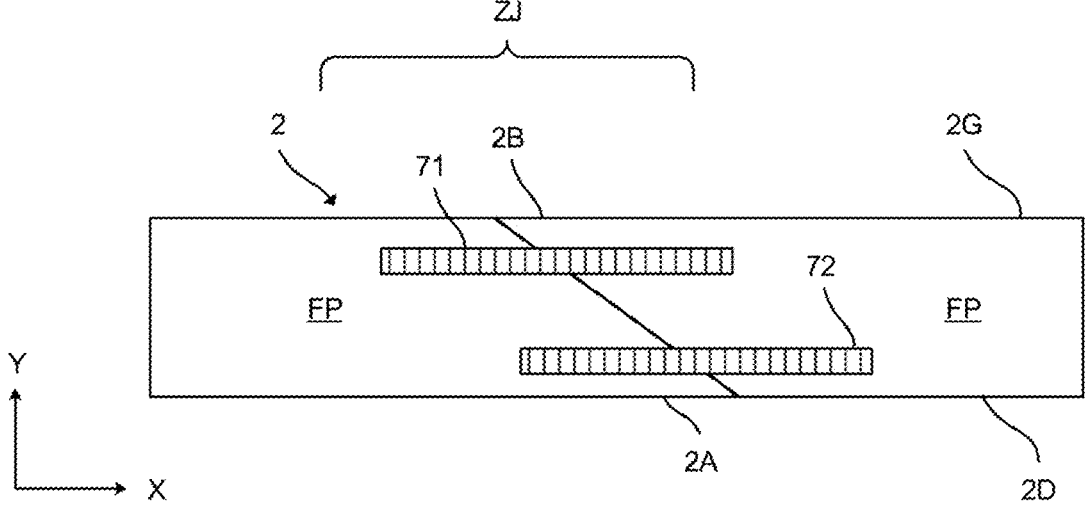
FIG. 12 is a schematic representation of a step of positioning connecting elements in the recesses according to the invention.

Before its joining, the linear belt 2 is cut to the desired length so as to form the endless belt BSF suited to conveyor 1. According to a preferred aspect of the invention, as shown in FIG. 9, the longitudinal ends 2A, 2B are beveled at a bevel angle θ which is between 30 and 60°, preferably about 45° so as to allow the distribution of the loads over a joining zone ZJ as shown in FIG. 12. Preferably, the joining zone ZJ has a length between 20 cm and 100 cm for a 35 cm wide belt. Preferably, the bevel angle θ is determined to allow passage between the teeth 21. In other words, the teeth 21 are not impacted by the cut, which prevents disturbing the driving and facilitates cutting.

Figure 10:
FIG. 10 is a schematic representation of the steps of implementing a method for joining according to the invention.

An example embodiment of a method for joining according to the invention will now be presented in reference to FIG. 10 which schematically represents different steps.

Figure 11:
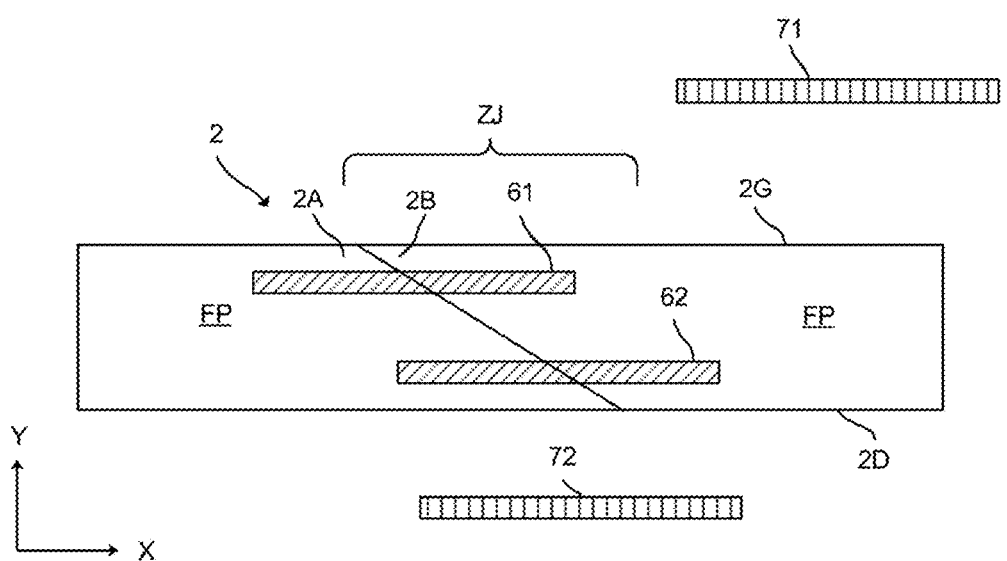
FIG. 11 is a schematic representation of a step of forming recesses in the linear belt according to the invention.

In reference to FIG. 11, the method for joining comprises a step E1 of abutting longitudinal ends 2A, 2B of the linear belt 2 and of rigidly connecting. Preferably, the step of rigidly connecting is carried out by welding. Each end of the longitudinal belt 2A, 2B of the linear belt 2 is heated, then the longitudinal ends 2A, 2B are brought into contact to form a loop.

In reference to FIG. 11, the method for joining comprises a step E2 of forming recesses 61, 62 between the first longitudinal end 2A and the second longitudinal end 2B of the linear belt 2 so as to uncover the reinforcing members 31, 32.

In this example, each recess 61, 62 has a length of between 20 cm and 100 cm so as to form a sufficiently robust connection. Preferably, each recess 61, 62 has a thickness of between 20 mm and 70 mm so as to uncover the reinforcing members 31, 32 and ensure a robust connection as will be presented later.

Contrary to the prior art, the recesses 61, 62 are formed in the product face FP of the linear belt 2 so as to prevent any detachment of the connecting elements 71, 72 as will be presented later.

Preferably, during the steps of forming the recesses 61, 62, the material of the upper layer 23 is removed by milling. The upper layer 23 has lower hardness than the lower layer 22. Also, for optimal removal of the material from the upper layer 23, a controlled milling device of the numerical control type, is used in order to obtain an optimum rotation speed of the milling cutter of about 3,000 rpm in order to prevent the formation of defects (penetration, deposit formation, etc.).

To reach the reinforcing members 31, 32, the recesses 4 are deeper than in the prior art, since the reinforcing members 31, 32 are further away from the product face FP than the drive face FG.

As shown in FIG. 12, the method comprises a step of rigidly connecting E3 a connecting element 71, 72 in each recess 61, 62.

Figure 13:
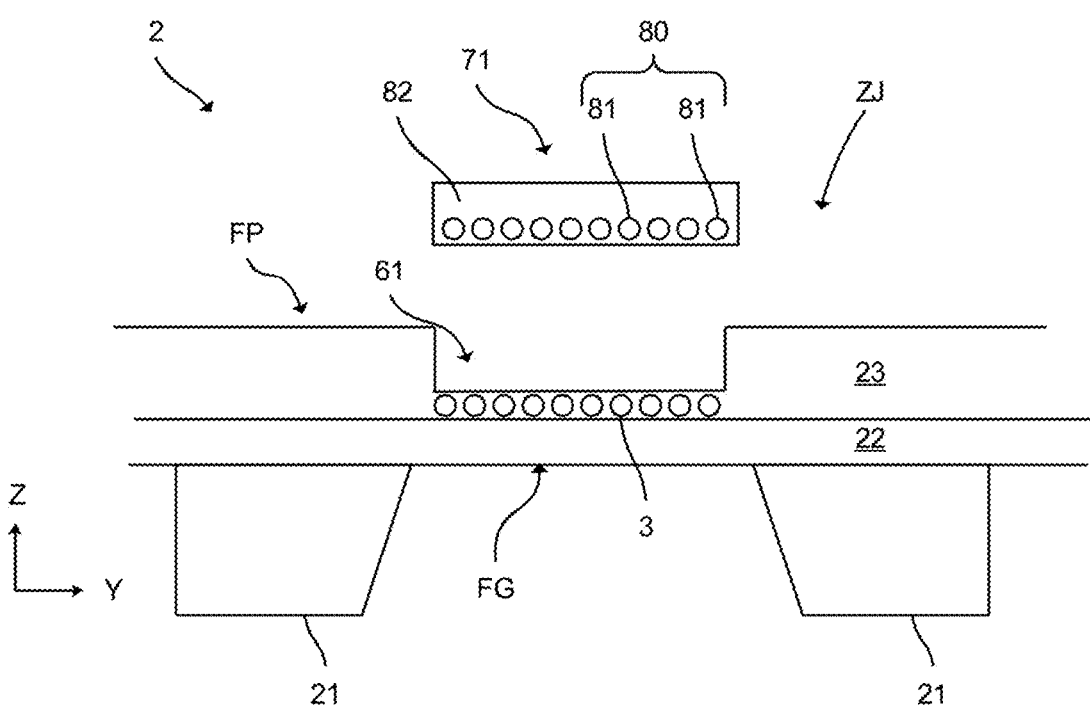
FIG. 13 is a schematic cross-sectional representation of a step of positioning a first connecting element in a first global recess according to the invention.

In reference to FIG. 13, the first connecting element 71 intended to be positioned in the first overall recess 61 is schematically represented. The second connecting element 72 is identical and will not be presented in detail.

The first connecting element 71 has a shape complementary to that of the first global recess 61, in this example, a shape of a block. Advantageously, the first connecting element 71 is thicker than in the prior art and, preferably, wider. Indeed, its width is no longer constrained by the separation of the teeth 21 as in the prior art.

In reference to FIG. 13, the first connecting element 71 comprises a plurality of additional reinforcing members 81, preferably a number substantially equal to the reinforcing members 31 uncovered by the first global recess 61. The additional reinforcing elements 81 are embedded in a material 80 which is similar, preferably identical, to that of the upper layer 23. In other words, the material 80 of the first connecting element 71 has low hardness. The additional reinforcing members 81 are preferably located in a lower portion of the first connecting element 71 so as to be adjacent to the integrated reinforcing members 31 and thus allow continuity in the taking up of the tensile forces without creating excessive longitudinal rigidity. The material 80 of the first connecting element 71 is preferably heat-sealable.

Figure 14:
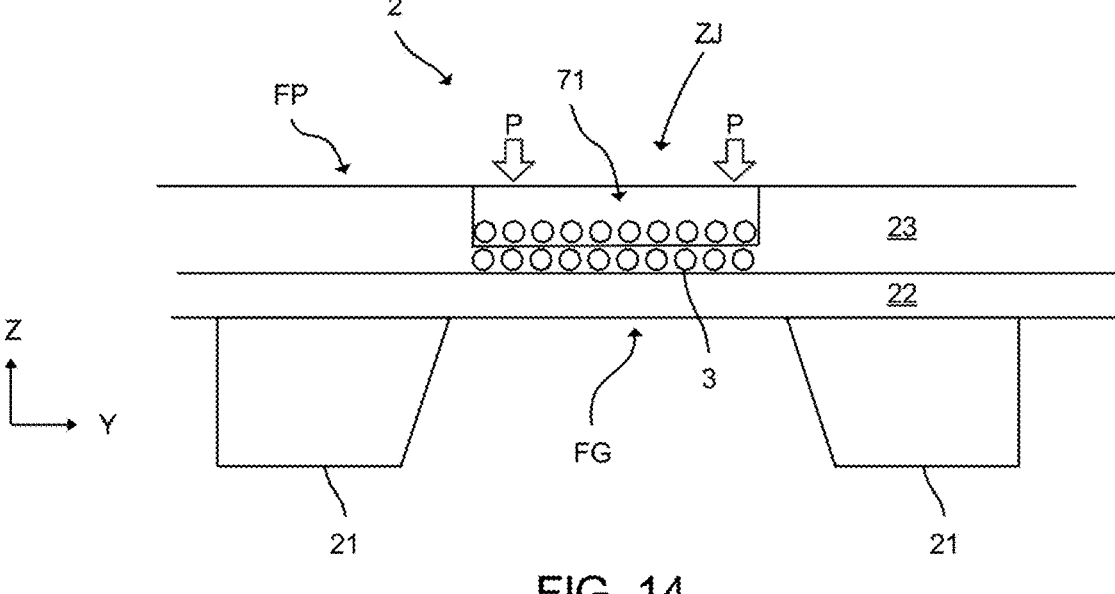
FIG. 14 is a schematic cross-sectional representation of an endless belt after its joining.

To ensure an optimum rigid connection, the connecting elements 71 and 72 are heated so that the material 80, which encapsulates the additional reinforcement elements 81, is partially melted. Then, in reference to FIG. 14, each heated connecting element 71, 72 is positioned in its recess 61, 62 and then pressed into the latter so as allow the material 80 to amalgamate with the upper layer 23, allowing for an optimal connection. Due to its thickness and its more substantial width, each connecting element 71, 72 has a more substantial connecting surface, which improves the connection. In addition, as shown in FIG. 14, applying pressure P to the product face FP at the first connecting element 71 makes it possible to ensure optimal welding conditions and an exemplary surface condition, with the product surface FP remaining smooth despite the joining.

Thanks to the invention, the endless belt BSF has a higher resistance. Due to its positioning on the product face FP, each connecting element 71, 72 advantageously undergoes lower pull-out forces than in the prior art. The positioning of the reinforcing members 31, 32 may advantageously be made independent of the positioning and shape of the teeth 21, which facilitates the design.

The invention claimed is:

1. A method of joining longitudinal ends of a linear belt to form an endless belt configured to be mounted in an ascending conveyor for transporting foodstuffs, the linear belt comprising two lateral edges, two longitudinal ends, a top face intended to receive the foodstuffs to be transported, hereinafter referred to as a product face, and an opposite bottom face, intended to cooperate with conveyor drive means, hereinafter referred to as a drive face, the linear belt being deformable transversely between a flat configuration, at rest, and a tubular or at least substantially tubular configuration, wherein the two lateral edges are positioned edge to edge, the linear belt comprising an upper layer made of a material having a first hardness and forming the product face, and a lower layer made of a material having a second hardness, greater than the first hardness, and forming the drive face, the linear belt comprising a plurality of longitudinal reinforcing members, arranged in its thickness, adapted to limit its longitudinal elongation during the use thereof, the method for joining comprising steps of:

rigidly connecting the longitudinal ends of the linear belt, forming at least one recess in a first longitudinal end and in a second longitudinal end of the linear belt so as to uncover at least one reinforcing member, rigid connecting of a connecting element in the recess, the connecting element comprising additional reinforcing members and having a shape complementary to the recess, wherein the recess is formed from the product face of the linear belt.

2. The method according to claim 1, wherein the longitudinal ends are beveled.

3. The method according to claim 1, wherein the connecting element is rigidly connected to the recess by heating.

4. The method according to claim 3, comprising a step of pressing the connecting element into the recess after the heating step.

5. The method according to claim 1, wherein the longitudinal reinforcing members are positioned in the upper layer.

6. The method according to claim 1, wherein the linear belt comprises at least two groups of longitudinal reinforcing members.

7. The method according to claim 6, comprising a step of forming two recesses to uncover the at least two groups of longitudinal reinforcing members.

8. The method according to claim 1, wherein the additional reinforcing members of the connecting element are embedded in a material similar to that of the upper layer.

9. The method according to claim 1, wherein the connecting element has a length of between 20 cm and 100 cm.

10. The method according to claim 1, wherein the connecting element has a thickness of between 20 mm and 70 mm.

11. The method according to claim 1, wherein the lower layer comprises teeth adapted to cooperate with the conveyor drive means of the ascending conveyor, the longitudinal reinforcing members are positioned at least partially above the teeth.

12. The method according to claim 1, wherein the longitudinal reinforcing members are closer to the drive face than to the product face.

* * * * *